Oct. 23, 1923.  1,471,389
S. DI TRAPANI ET AL
COFFEEPOT
Filed Nov. 14, 1922   2 Sheets-Sheet 1
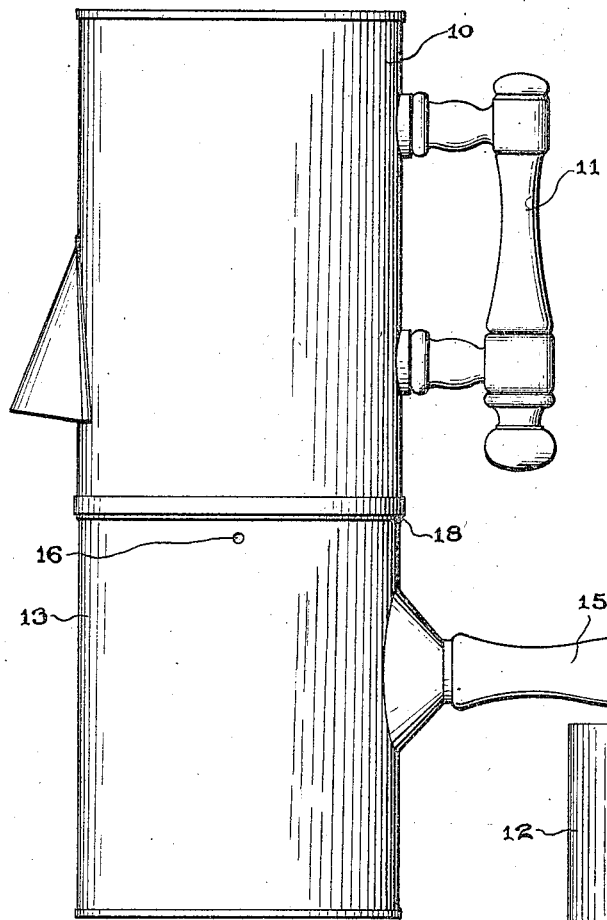
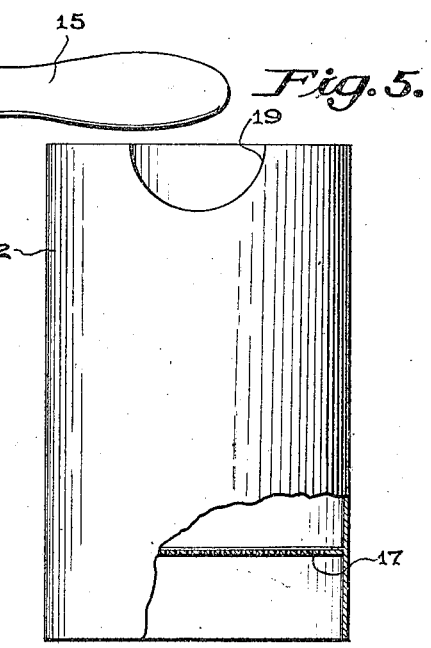
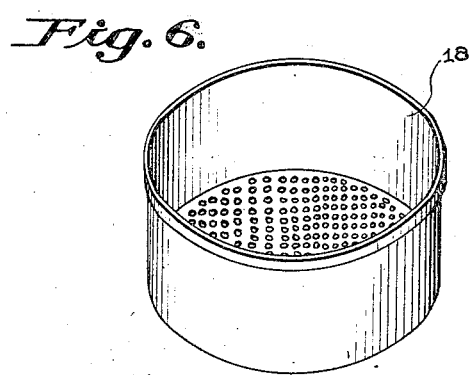
Salvatore Di Trapani
Jack Fecarotta
INVENTOR

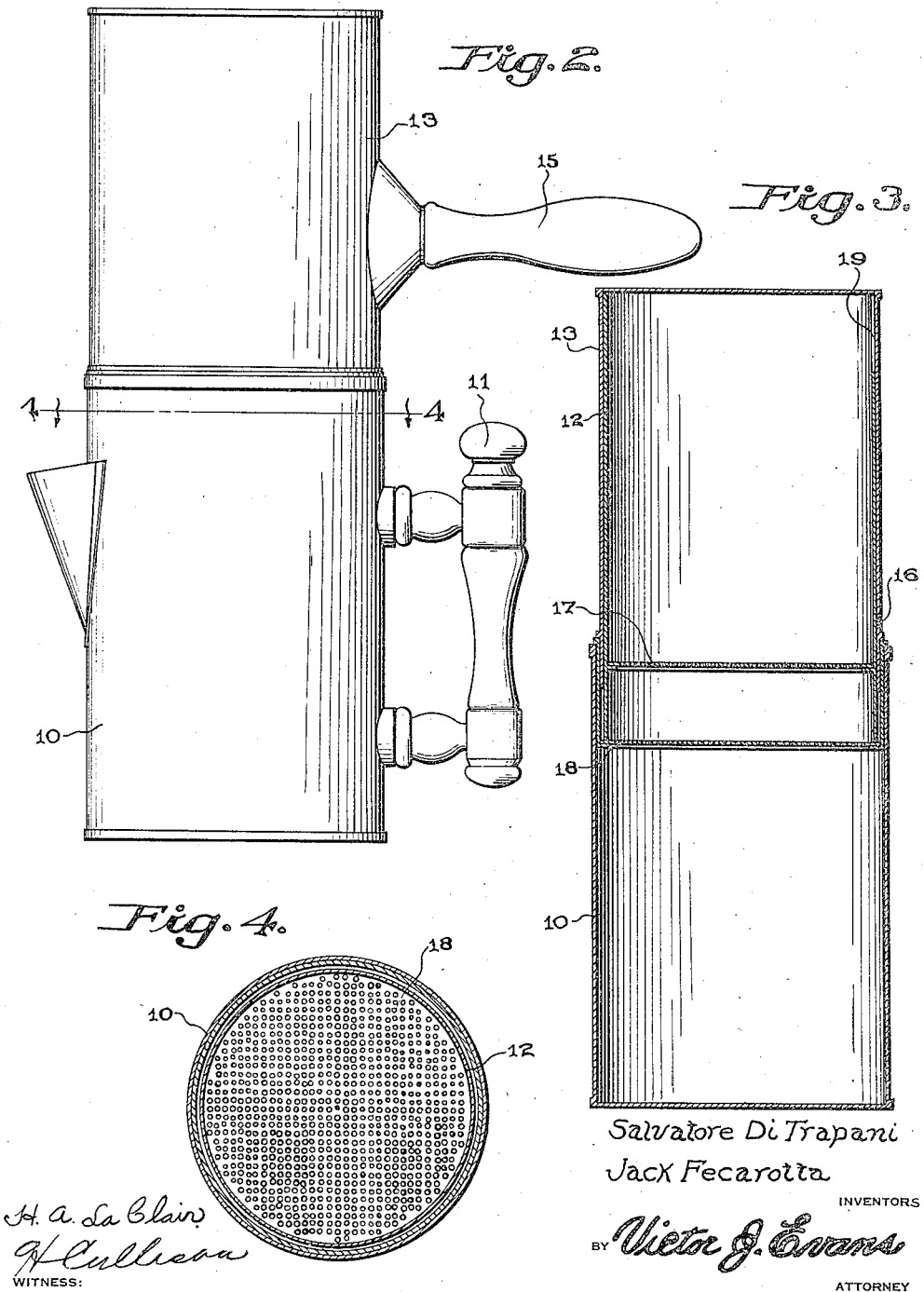

Patented Oct. 23, 1923.

1,471,389

UNITED STATES PATENT OFFICE.

SALVATORE DI TRAPANI AND JACK FECAROTTA, OF DETROIT, MICHIGAN.

COFFEEPOT.

Application filed November 14, 1922. Serial No. 600,914.

*To all whom it may concern:*

Be it known that we, SALVATORE DI TRAPANI and JACK FECAROTTA, respectively a subject of the King of Italy and a citizen of the United States, residing at Detroit, in the county of Wayne and State of Michigan, have invented new and useful Improvements in Coffeepots, of which the following is a specification.

This invention relates to coffee percolators and embodies amongst other features, a coffee pot adapted to be supported in an inverted position upon a water container until the water is boiled, whereupon the positions of said pots are reversed, allowing the water to percolate into said pot through a coffee compartment which is arranged between the container and said coffee pot.

In carrying out the invention, we provide a novel construction of means to permit the escape of the steam incident to the boiling of the water in said container, and at the same time prevent the water from spilling therefrom when the latter is inverted.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view showing the initial arrangement of the parts.

Figure 2 is a similar view showing the inverted positions of said parts.

Figure 3 is a vertical sectional view through the percolator.

Figure 4 is a transverse sectional view taken on the line 4—4 of Figure 2.

Figure 5 is a detail view of the inner part of the water container partly in section.

Figure 6 is a detail view of the removable top for the coffee compartment.

Referring to the drawings in detail, 10 indicates a coffee pot of well known construction, the handle of which is indicated at 11.

In combination with the pot 10 we employ a water container which consists of two parts, an inner part 12 and an outer part 13. The outer part somewhat resembles the coffee pot 10, and is provided with a handle 15 and an opening 16 adjacent the upper end thereof for the purpose to be hereinafter described. The inner part 12 is of a diameter to snugly fit within the outer part 13, and is open at both ends, this part reposing upon the bottom of the outer part 13 when the parts are associated. The inner part is considerably higher than the outer part, so that when said parts are associated, the inner part projects an appreciable distance above the open end of the outer part. The projecting portion of the inner part 12 is received by the coffee pot 10, and in this manner, the coffee pot is held associated with the water container incident to the use of the percolator.

In practice, the water is placed in the inner part 12 of the water container, which very snugly contacts the wall of the outer part 13, after which coffee is arranged in the compartment above referred to, supported by the perforated partition 17. The cover 18 is then placed upon the inner part 12, and the coffee pot 10 is subsequently arranged in an inverted position upon the water container. The parts are retained in this position until the water in the container is boiled, whereupon the percolator in its entirety is inverted, thereby allowing the water to pass from the container into the coffee pot, and through the coffee compartment which is arranged between said parts. It will be noted that the lower end of the inner part 12 is cut-away as at 19 to permit the steam to escape from the bottom of the inner part through the space between said parts, and out through the opening 16 provided in the outer part 13 of the water container. While this construction permits of the escape of steam, and it may be relied upon by the user to determine when the water has reached the boiling point, the opening 16 being closed by the wall of the inner part 12, prevents any spilling or escape of water through this opening when the parts are arranged in the manner illustrated in Figure 2, in which position, the water container in its entirety is inverted.

While it is believed that from the foregoing description, the nature and advantages of the invention will be readily apparent, we desire to have it understood that we do not limit ourselves to what is herein shown and described and that such changes may be resorted to when desired as fall within the scope of what is claimed.

Having thus described the invention, we claim:

A coffee percolator comprising a coffee pot, a water container including snugly associated inner and outer parts, said outer part having an opening adjacent the upper end thereof, said inner part being open at both ends, and arranged with one end reposing upon the bottom of the outer part, and the other end projecting above the latter, and adapted to be received by the coffee pot, said inner part being cut-away adjacent the end reposing upon the bottom of the outer part, to permit the escape of the steam from the container through said opening in the outer part, a perforated partition arranged within the inner part and defining a coffee receiving compartment, and a perforated cover for said compartment, said cover being fitted upon the projecting portion of the inner part and adapted to be received by said coffee pot.

In testimony whereof we affix our signatures.

SALVATORE DI TRAPANI.
JACK FECAROTTA.